US007648938B2

(12) United States Patent
Miyashita et al.

(10) Patent No.: US 7,648,938 B2
(45) Date of Patent: Jan. 19, 2010

(54) METAL NANOCOLLOIDAL LIQUID, METHOD FOR PRODUCING METAL SUPPORT AND METAL SUPPORT

(75) Inventors: Kiyoshi Miyashita, Tokyo (JP); Masamichi Kezuka, Tokyo (JP); Tetsuro Yoshii, Tokyo (JP); Ryohei Ogawa, Tokyo (JP); Akihiro Hishinuma, Tokyo (JP); Tsutomu Sakai, Kyoto (JP); Toyo Yano, Kyoto (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 330 days.

(21) Appl. No.: 10/582,509

(22) PCT Filed: Dec. 15, 2004

(86) PCT No.: PCT/JP2004/018741

§ 371 (c)(1),
(2), (4) Date: Jun. 9, 2006

(87) PCT Pub. No.: WO2005/056222

PCT Pub. Date: Jun. 23, 2005

(65) Prior Publication Data

US 2007/0093377 A1 Apr. 26, 2007

(30) Foreign Application Priority Data

| | | |
|---|---|---|
| Dec. 15, 2003 | (JP) | 2003-416146 |
| Dec. 15, 2003 | (JP) | 2003-416147 |
| Dec. 15, 2003 | (JP) | 2003-416148 |

(51) Int. Cl.

| | |
|---|---|
| ***B01J 21/18*** | (2006.01) |
| ***B01J 23/00*** | (2006.01) |
| ***B01J 23/40*** | (2006.01) |
| ***B01J 23/74*** | (2006.01) |
| ***B01J 21/00*** | (2006.01) |
| ***B01J 23/42*** | (2006.01) |
| ***B01J 23/44*** | (2006.01) |
| ***B01F 3/08*** | (2006.01) |
| ***B01F 3/12*** | (2006.01) |
| ***C09K 3/00*** | (2006.01) |

(52) U.S. Cl. ....................... 502/182; 502/180; 502/185; 502/240; 502/243; 502/261; 502/262; 502/325; 502/339; 502/344; 516/33; 516/78; 516/97

(58) Field of Classification Search ................. 502/180, 502/182, 185, 240, 243, 261, 262, 325, 339, 502/344; 516/97, 33, 78
See application file for complete search history.

(56) References Cited

U.S. PATENT DOCUMENTS

| | | | | | |
|---|---|---|---|---|---|
| 3,011,920 | A | * | 12/1961 | Shipley, Jr. | 106/1.11 |
| 3,180,835 | A | * | 4/1965 | Peri | 516/33 |
| 3,230,034 | A | * | 1/1966 | Stiles | 423/213.2 |
| 3,814,696 | A | * | 6/1974 | Verdone et al. | 516/33 |
| 3,841,881 | A | * | 10/1974 | Feldstein et al. | 106/1.11 |
| 4,136,059 | A | | 1/1979 | Jalan et al. | |
| 4,252,677 | A | * | 2/1981 | Smith | 502/5 |
| 4,252,678 | A | * | 2/1981 | Smith | 502/5 |
| 4,309,454 | A | * | 1/1982 | Feldstein | 427/98.1 |
| 5,160,452 | A | * | 11/1992 | Marutsuka et al. | 516/33 |
| 5,213,895 | A | * | 5/1993 | Hirai et al. | 428/403 |
| 5,288,313 | A | * | 2/1994 | Portner | 106/1.11 |
| 5,308,377 | A | | 5/1994 | Bonnemann et al. | |
| 6,051,614 | A | * | 4/2000 | Hirai et al. | 516/20 |
| 7,244,688 | B2 | * | 7/2007 | Reetz et al. | 502/182 |
| 2006/0134506 | A1 | * | 6/2006 | Kim et al. | 429/44 |

FOREIGN PATENT DOCUMENTS

| | | | |
|---|---|---|---|
| JP | 54-92588 | | 7/1979 |
| JP | 03-134106 | | 6/1991 |
| JP | 2001-224969 | * | 8/2001 |
| JP | 2002-241813 | * | 8/2002 |
| JP | 2003-166006 | | 6/2003 |
| JP | 2006-166006 | * | 6/2003 |

OTHER PUBLICATIONS

Search Report for PCT/JPO4/18741.*

* cited by examiner

*Primary Examiner*—Patricia L Hailey
(74) *Attorney, Agent, or Firm*—Antonelli, Terry, Stout & Kraus, LLP.

(57) ABSTRACT

The present invention provides a metal nanocolloidal liquid characterized by containing a dispersion medium and nanocolloidal metal particles, and containing substantially no protective colloid-forming agent; and a method for producing a metal-on-carrier, characterized by including causing nanocolloidal metal particles to be carried on a carrier by use of the metal nanocolloidal liquid. According to the production method, nanocolloidal metal particles can be efficiently caused to be carried on a carrier, and a metal-on-carrier which is useful in a variety of fields can be industrially advantageously produced.

3 Claims, No Drawings

METAL NANOCOLLOIDAL LIQUID, METHOD FOR PRODUCING METAL SUPPORT AND METAL SUPPORT

TECHNICAL FIELD

The present invention relates to a metal nanocolloidal liquid; a method for producing a metal-on-carrier by use of the metal nanocolloidal liquid; and a metal-on-carrier. More particularly, the present invention relates to a metal nanocolloidal liquid containing substantially no protective colloid-forming agent and exhibiting excellent dispersion stability over a long period of time even when nanocolloidal metal particles having a mean particle size of about 1 to about 20 nm are contained in a relatively large amount; to a method for producing a metal-on-carrier which is useful in a variety of fields, the method employing the metal nanocolloidal liquid; and to a metal-on-carrier.

BACKGROUND ART

In recent years, metal-on-carrier, which is formed of a metal carried on a carrier such as carbon material, ceramic/metal oxide material, metallic material, or organic polymer material, has become of interest as functional material in a variety of fields, and extensive research and development has been conducted on new applications of such a metal-on-carrier.

Examples of such metal-on-carriers which have heretofore been developed include (1) electrically conductive particles formed of insulating particles (e.g., resin particles) whose surfaces are coated with a metal; (2) a catalyst for decomposing a disinfectant or bleaching agent, the catalyst being formed of a resin material having an electrical-conductivity-imparted surface on which a noble metal is carried; (3) a catalyst for purification of automobile exhaust gas, the catalyst being formed of a porous support on which a noble metal is carried; and (4) a photocatalytic thin film formed of a high-catalytic-performance thin film coated with a noble metal. In the field of fuel cell, developed applications of such a metal-on-carrier include (5) a reforming catalyst for reforming a hydrocarbon compound or an oxygen-containing hydrocarbon compound, thereby generating hydrogen, the catalyst being formed of an inorganic oxide support on which a noble metal (e.g., ruthenium) is carried; (6) a shift reaction catalyst for reducing the amount of carbon monoxide contained in hydrogen gas, the catalyst being formed of an inorganic oxide support on which a noble metal is carried; and (7) an electrode catalyst for a fuel cell, the catalyst being formed of a carbon material on which a noble metal is carried.

General features and background of the aforementioned metal-on-carriers will next be described.

[Electrically Conductive Particles]

An electrode section of a liquid crystal device or the like employs an anisotropic electrically conductive member which conducts electricity between specific electrodes or in a specific direction through deformation of electrically conductive particles under application of pressure. Such an anisotropic electrically conductive member incorporates electrically conductive particles formed of insulating particles (e.g., resin particles) whose surfaces are coated with, for example, gold. In general, an inductor or multi-layer capacitor employed in electronic parts is produced by laminating a magnetic layer on an electrically conductive layer, and subjecting the resultant laminate to sintering. Generally, such an electrically conductive layer is formed from a conductive-material-forming paste containing electrically conductive particles.

[Disinfectant-decomposing Catalyst]

Peroxides such as hydrogen peroxide and ozone are useful substances having disinfectant, antiseptic, and bleaching effects. However, a large amount of such a peroxide may be harmful to (i.e., adversely affect) the human body. Therefore, after intended effects have been attained by such a peroxide employed in a large amount, the thus-employed peroxide is subjected to neutralization-decomposition treatment. As has been known, a noble metal (e.g., platinum) serves as a decomposition catalyst in such decomposition treatment. For example, lightweight catalyst materials of different structures for decomposing a disinfectant, a bleaching agent, or the like can be produced by, for example, imparting electrical conductivity to the surface of a resin material formed of, for example, polyphenylene ether (hereinafter may be abbreviated as "PPE") or polyphenylene sulfide (hereinafter may be abbreviated as "PPS") in advance, and by causing a noble metal material to be carried on the resin material.

[Catalyst for Purification of Automobile Exhaust Gas]

In recent years, $No_x$ occlusion-reduction-type catalysts have been widely employed as catalysts for purification of lean-burn automobile exhaust gas. Such an $NO_x$ occlusion reduction-type catalyst includes particles of a noble metal having catalytic activity (e.g., platinum or palladium), and a carbonate of a metal (generally an alkaline earth metal such as barium), the particles and the carbonate being carried on a porous support formed of pellets of ceramic material (e.g., alumina or zirconia) or a honeycomb molded material of such ceramic material, or formed of a metallic honeycomb structure coated with ceramic material. In such an $NO_x$ occlusion-reduction-type catalyst, noble metal particles serve as a catalytic component for promoting decomposition of $NO_x$, and an alkaline earth metal serves as an $NO_x$-occluding agent.

[Photocatalytic Thin Film]

When a photocatalytic material (hereinafter may be referred to simply as a "photocatalyst") is irradiated with light having an energy equal to or greater than the band gap energy thereof, electrons are excited to the conduction band, and holes are provided in the valence band. The thus-excited electrons reduce oxygen on the surface of the photocatalyst, to thereby form superoxide anions ($.O^{2-}$), whereas the thus-generated holes oxidize hydroxyl groups on the photocatalyst surface, to thereby form hydroxyl radicals (.OH). As has been known, the thus-formed reactive oxygen species exhibit strong oxidation/decomposition performance, and thus are highly efficient in decomposing organic substances deposited onto the surface of the photocatalyst.

Titanium dioxide (in particular, anatase titanium dioxide) is practically useful as such a photocatalytic material. For the purpose of promoting the photocatalytic activity of a layer formed of such a photocatalytic material, the layer is provided with a coating layer formed of a platinum group metal (e.g., platinum, palladium, rhodium, or ruthenium).

[Metal-on-carriers in the Field of Fuel Cell]

In a fuel cell, chemical energy is converted into electrical energy through electrochemical reaction between hydrogen and oxygen. Fuel cells, which are characterized by high energy-utilization efficiency, have been extensively studied for practical use; for example, consumer use, industrial use, or automotive use.

Studies have been conducted on employment, as a hydrogen source, of methanol, liquefied natural gas predominantly containing methane, city gas predominantly containing such natural gas, a synthetic liquid fuel formed from natural gas, a hydrocarbon fuel such as petroleum hydrocarbon (e.g., LPG, naphtha, or kerosene), or an oxygen-containing hydrocarbon fuel.

In the case where hydrogen is generated by use of the aforementioned hydrocarbon fuel or oxygen-containing hydrocarbon fuel, reforming treatment (e.g., steam reforming or partial oxidation reforming) is carried out. In such a case, a catalyst formed of an inorganic oxide support on which a noble metal (e.g., ruthenium) is carried is generally employed as a reforming catalyst.

Generally, hydrogen gas obtained through the aforementioned reforming treatment contains CO. In a fuel cell; in particular, a low-temperature operation fuel cell (e.g., a polymer electrolyte fuel cell), CO is prone to poison a platinum catalyst serving as an electrode. Therefore, CO concentration must be reduced through conversion of CO into a nontoxic substance (e.g., $CO_2$). Such CO reduction is generally carried out through a method employing shift reaction. Such shift reaction employs a catalyst formed of an inorganic oxide support on which a noble metal is carried.

From the viewpoint of promotion of chemical reaction, an electrode constituting a polymer electrolyte fuel cell is formed of a carbon material (e.g., graphite or carbon black) on which a noble metal (e.g., platinum) is carried.

Such a noble-metal-on-carrier is formed through a physical vapor deposition (PVD) method (e.g., vacuum deposition or sputtering) or a wet method (e.g., electroplating, electroless plating, or a method for causing colloidal metal particles to be carried on a carrier (hereinafter the method may be referred to simply as a "colloidal metal carrying method")). The noble-metal-on-carrier formation method may be appropriately selected from among the aforementioned methods in accordance with, for example, the use of the metal-on-carrier or the type of a carrier to be employed. Of these methods, a colloidal metal carrying method—in which a metal nanocolloidal liquid containing nanocolloidal metal particles is applied to a carrier through a technique (e.g., immersion, spraying, or evaporation to dryness), to thereby cause the nanocolloidal metal particles to be carried on the carrier—is advantageous in that, for example, the method is easy to perform, and does not require any expensive coating apparatus. As used herein, the term "nanocolloidal particles" refers to colloidal particles having a particle size of less than about 100 nm.

However, in such a metal nanocolloidal liquid, generally, nanocolloidal metal particles exhibit poor dispersion stability, and are prone to form aggregates. Therefore, generally, a water-soluble polymer compound (e.g., polyvinyl alcohol, polyvinyl pyrrolidone, or gelatin) or a protective colloid-forming agent (e.g., a surfactant) is added to the metal nanocolloidal liquid, and a protective colloid is formed, whereby the dispersion stability of the nanocolloidal metal particles is improved.

For example, there have been disclosed a method in which a metal oxide thin film deposited on an insulating substrate is immersed in a noble metal colloid obtained by adding, to an aqueous noble metal chloride solution, an aqueous polyethylene glycol monooleyl ether solution serving as a protective colloid-forming agent, to thereby cause the noble metal to be carried on the metal oxide thin film (see, for example, Patent Document 1); a method for producing an exhaust gas purifying catalyst, in which a noble metal colloidal liquid is prepared by use of a quaternary ammonium salt having at least one C1-C4 alkyl group serving as a protective colloid-forming agent, and the colloidal liquid is adsorbed onto a porous support (see, for example, Patent Document 2); and a method for producing a photocatalytic thin film carrying fine noble metal particles, in which a noble metal fine particulate colloid which has been stabilized with a surfactant is applied onto a thin film having photocatalytic function, followed by thermal treatment at about 400 to about 600° C. in a reducing atmosphere (see, for example, Patent Document 3).

However, in the case where such a protective colloid-forming agent is employed, when nanocolloidal metal particles are caused to be carried on a carrier, the protective colloid-forming agent is deposited on the surfaces of the nanocolloidal metal particles carried on the carrier; i.e., the resultant metal-on-carrier contains an organic substance. In some cases, such an organic-substance-containing metal-on-carrier may fail to sufficiently perform its intended function. In such a case, the metal-on-carrier must be subjected to treatment for removal of the organic substance (e.g., firing treatment). However, in some cases, the carrier cannot be subjected to firing treatment. Thus, employment of a protective colloid-forming agent also poses a problem in that a limitation is imposed on the type of the carrier to be employed.

Known methods for producing a metal nanocolloidal liquid employing no protective colloid-forming agent include a method in which a reducing agent is added to a metal chloride solution, and fine metal particles are formed through reduction of metallic ions (see, for example, Patent Document 4 and Non-Patent Document 1).

When colloidal particles are caused to be carried on a carrier by use of such a metal nanocolloidal liquid containing no protective colloid-forming agent, generally, there is employed a method for causing the colloidal particles to be carried on the carrier through spontaneous adsorption. However, this method raises problems in that the particles are caused to be carried on the carrier at low rate, and the amount of the particles to be carried cannot be increased to a sufficient extent.

When a metal-on-carrier is to be produced by use of a metal nanocolloidal liquid, desirably, a maximum possible amount of nanocolloidal metal particles is caused to be carried on a carrier in one operation, from the viewpoint of operation efficiency. Therefore, a metal nanocolloidal liquid to be employed is required to contain colloidal particles in a large amount.

However, the aforementioned metal nanocolloidal liquid production method employing no protective colloid-forming agent involves a problem in that when a metal nanocolloidal liquid containing nanocolloidal metal particles in a large amount is to be prepared, the colloidal particles are prone to aggregate and precipitate. Conceivably, when the distance between fine metal particles becomes excessively small, such particle aggregation occurs as a result of electrostatic shielding and insufficient repulsion between the metal particles, since merely ions adsorbed onto the metal particles contribute to dispersion of the particles.

Therefore, demand has arisen for a metal nanocolloidal liquid containing nanocolloidal metal particles in a large amount, containing no protective colloid-forming agent, and exhibiting good dispersion stability. In a conventional technique, when a metal nanocolloidal solution is to be prepared from platinum particles without employing a protective colloid-forming agent, the amount of the particles contained in the solution is limited to about 150 mass ppm.

Conventionally, spraying has been widely employed as a technique for causing nanocolloidal metal particles to be carried on a carrier by use of a metal nanocolloidal liquid. However, a conventional spraying technique may pose problems in terms of, for example, safety of volatile components, regulation of the concentration of a spraying liquid, damage to a carrier, and safety to the human body. In addition, such a spraying technique involves a problem in that, for example, a treatment (e.g., firing or reduction) for removal of a protective colloid-forming agent may be required after nanocolloidal metal particles have been caused to be carried on a carrier.

Patent Document 1: Japanese Patent Application Laid-Open (kokai) No. 2000-87248

Patent Document 2: Japanese Patent Application Laid-Open (kokai) No. 2002-1119

Patent Document 3: Japanese Patent Application Laid-Open (kokai) No. 11-71137

Patent Document 4: Japanese Patent Application Laid-Open (kokai) No. 2001-224969

Non-Patent Document 1: "Surface," Vol. 21, No. 8, pp. 450-456 (1983)

DISCLOSURE OF THE INVENTION

In view of such circumstances, an object of the present invention is to provide a metal nanocolloidal liquid containing substantially no protective colloid-forming agent and exhibiting excellent dispersion stability over a long period of time even when nanocolloidal metal particles are contained in a relatively large amount. Another object of the present invention is to provide a method for producing a metal-on-carrier which is useful in a variety of fields, the method employing the metal nanocolloidal liquid, in which large amounts of nanocolloidal metal particles are caused to be carried on a carrier at a high rate in an efficient manner. Another object of the present invention is to provide a metal-on-carrier produced through this production method.

In order to attain the aforementioned objects, the present inventors have conducted extensive studies, and as a result have found that the objects can be attained by a metal nanocolloidal liquid containing nanocolloidal metal particles in a certain amount or more, the metal nanocolloidal liquid being obtained by preparing a dilute metal nanocolloidal liquid containing substantially no protective colloid-forming agent, and removing a dispersion medium from the nanocolloidal liquid through evaporation under mild conditions for concentration. The present invention has been accomplished on the basis of this finding.

Accordingly, the present invention provides:

(1) a metal nanocolloidal liquid characterized by containing a dispersion medium and nanocolloidal metal particles, and containing substantially no protective colloid-forming agent;

(2) a metal nanocolloidal liquid as described in (1) above, which has a nanocolloidal metal particle concentration of 250 mass ppm or more;

(3) a metal nanocolloidal liquid as described in (1) or (2) above, wherein the amount of the protective colloid-forming agent as reduced to carbon is equivalent to a total carbon of 0 to 200 mass ppm with respect to the nanocolloidal metal particles;

(4) a metal nanocolloidal liquid as described in any of (1) through (3) above, wherein the nanocolloidal metal particles have a mean particle size of 1 to 20 nm;

(5) a metal nanocolloidal liquid as described in any of (1) through (4) above, wherein the nanocolloidal metal particles are nanocolloidal particles of at least one noble metal selected from the group consisting of platinum, ruthenium, palladium, rhodium, rhenium, osmium and gold;

(6) a metal nanocolloidal liquid as described in any of (1) through (5) above, wherein the dispersion medium is an aqueous medium;

(7) a method for producing a metal-on-carrier, characterized by comprising causing nanocolloidal metal particles to be carried on a carrier by use of a metal nanocolloidal liquid as recited in any of (1) through (6) above;

(8) a method for producing a metal-on-carrier as described in (7) above, wherein the carrier is an electrically conductive carrier, and the nanocolloidal metal particles are caused to be carried on the carrier through electrodeposition;

(9) a method for producing a metal-on-carrier as described in (8) above, wherein the metal nanocolloidal liquid contains a reducing agent in a molecule-based amount 0.03 to 0.25 times by mole the atom-based amount of the metal(s) constituting the nanocolloidal metal particles, and the reducing agent has been employed during production of the nanocolloidal liquid;

(10) a method for producing a metal-on-carrier as described in (8) or (9) above, wherein the electrically conductive carrier is a carrier formed of a carbon material, an electrically conductive metal oxide material, or a metallic material; or a carrier formed of a ceramic material, a non-electrically conductive metal oxide material, or an organic polymer material, and having an electrically conductive layer on the surface thereof;

(11) a method for producing a metal-on-carrier as described in any of (8) through (10) above, wherein the electrically conductive carrier has been subjected to surface treatment in advance by use of the reducing agent which has been employed during production of the metal nanocolloidal liquid;

(12) a method for producing a metal-on-carrier as described in (7) above, wherein the dispersion medium is an aqueous medium, and the nanocolloidal metal particles are caused to be carried on the carrier through spraying;

(13) a method for producing a metal-on-carrier as described in (12) above, wherein the metal nanocolloidal liquid is concentrated in a vapor phase, and the nanocolloidal metal particles are caused to be carried on the carrier;

(14) a method for producing a metal-on-carrier as described in (12) or (13) above, wherein the carrier is heated to 50 to 90° C., and the metal nanocolloidal liquid is sprayed onto the thus-heated carrier;

(15) a method for producing a metal-on-carrier as described in any of (12) through (14) above, wherein the carrier is provided with a masking member on a surface thereof, and the metal nanocolloidal liquid is sprayed onto the carrier through the masking member;

(16) a method for producing a metal-on-carrier as described in any of (12) through (15) above, wherein the carrier is formed of a carbon material, a ceramic/metal oxide material, a metallic material, or an organic polymer material; and

(17) a metal-on-carrier characterized by being produced through a production method as described in any of (7) through (16) above.

According to the present invention, there can be provided a metal nanocolloidal liquid containing substantially no protective colloid-forming agent, containing nanocolloidal metal particles having a mean particle size of about 1 to about 20 nm in a relatively large amount, and exhibiting excellent dispersion stability over a long period of time; a method for industrially advantageously producing a metal-on-carrier which is useful in a variety of fields, in which the metal nanocolloidal liquid is employed, and the nanocolloidal metal particles are caused to be carried on a carrier through electrodeposition or spraying in an efficient manner; and a metal-on-carrier produced through the production method.

BEST MODE FOR CARRYING OUT THE INVENTION

The metal nanocolloidal liquid of the present invention contains a dispersion medium and nanocolloidal metal particles, and contains substantially no protective colloid-forming agent. As used herein, the term "protective colloid-forming agent" refers to a substance which forms a protective colloid by being deposited on the surfaces of colloidal particles. Such a protective colloid-forming agent is generally contained in a colloidal liquid for maintaining dispersion stability of colloidal particles. Examples of protective colloid-forming agents include water-soluble polymer substances such as polyvinyl alcohol, polyvinyl pyrrolidone, and gelatin; surfactants; and polymer chelating agents (e.g., a compound described in section [0013] of Japanese Patent Application Laid-Open (kokai) No. 2000-279818).

In the present invention, even when substantially no protective colloid-forming agent is contained, the nanocolloidal metal particles exhibit excellent dispersion stability, and stable dispersibility is maintained over a practically sufficient period of time (e.g., about 3 to about 30 days). As used herein, the expression "a metal nanocolloidal liquid contains substantially no protective colloid-forming agent" refers to the case where the amount (as reduced to carbon) of a protective colloid-forming agent contained in the metal nanocolloidal liquid is about 0 to about 200 mass ppm with respect to nanocolloidal metal particles contained in the nanocolloidal liquid.

The metal nanocolloidal liquid of the present invention may have a nanocolloidal metal particle concentration falling within a wide range (from low level to high level). However, from the viewpoints of operation efficiency when nanocolloidal metal particles are caused to be carried on a carrier, as well as dispersion stability of the particles, the nanocolloidal metal particle concentration is generally about 40 to about 3,000 mass ppm. In the metal nanocolloidal liquid of the present invention, the nanocolloidal metal particle concentration may be 250 mass ppm or more, which is greater than that of nanocolloidal metal particles contained in a general metal nanocolloidal liquid (typically 200 mass ppm or less). However, when the nanocolloidal metal particle concentration is excessively high, dispersion stability is lowered. Therefore, from the viewpoint of dispersion stability, the nanocolloidal metal particle concentration is preferably 250 to 3,000 mass ppm, more preferably 500 to 2,000 mass ppm, particularly preferably 1,000 to 2,000 mass ppm.

The mean particle size of the aforementioned nanocolloidal metal particles is generally 1 to 20 nm, preferably 1 to 10 nm. In the case where the nanocolloidal metal particles are employed as a catalyst, from the viewpoint of catalytic activity, the mean particle size is preferably 1.6 to 5 nm.

No particular limitation is imposed on the species of the nanocolloidal metal particles, but preferably, the nanocolloidal metal particles are nanocolloidal particles of at least one noble metal selected from among platinum, ruthenium, palladium, rhodium, rhenium, osmium, and gold.

The dispersion medium which may be employed in the metal nanocolloidal liquid is selected from among, for example, water, an alcohol, a ketone, an ester, and an ether, from the viewpoint of production of metal nanocolloidal liquid as described hereinbelow. Examples of the alcohol include methanol, ethanol, 1-propanol, and 2-propanol. Examples of the ketone include acetone, methyl ethyl ketone, and methyl isobutyl ketone. Examples of the ester include methyl formate, methyl acetate, and ethyl acetate. Examples of the ether include methyl ethyl ether and diethyl ether. These dispersion media may be employed singly or in combination of two or more species. The dispersion medium to be employed is preferably water, an alcohol, or an aqueous medium such a mixture of water and an alcohol.

In the case where a metal-on-carrier is to be produced through spraying described hereinbelow in detail by use of the metal nanocolloidal liquid of the present invention, the metal nanocolloidal liquid is preferably an aqueous colloidal liquid. As used herein, the term "aqueous colloidal liquid" refers to a colloidal liquid employing an aqueous dispersion medium which contains water as a primary component, and, if necessary, a water-miscible organic solvent (e.g., an alcohol) to such an extent that the effects of the present invention are not impeded.

In the case where nanocolloidal metal particles are caused to be carried on a carrier through spraying, preferably, such an aqueous colloidal liquid is employed, from the viewpoint of environmental sanitation. In addition, when such an aqueous colloidal liquid is employed, a carrier to be employed is less adversely affected, the concentration of the colloidal liquid is easily regulated, and few problems arise in terms of waste liquid treatment.

The metal nanocolloidal liquid of the present invention can be produced through, for example, the below-described procedure.

Water to be employed is prepared by completely boiling pure water (e.g., distilled water, ion-exchanged water, or ultrafiltrated water) for removal of dissolved oxygen.

To an aqueous metal salt solution prepared by use of the aforementioned pure water, an aqueous reducing agent solution is added such that the concentration of the metal salt is about $1\times10^{-4}$ to about $15\times10^{-4}$ mol/L, and the amount of the reducing agent is about 1 to about 20 equivalents to that of the metal salt. Subsequently, reaction is performed under boiling for about 30 to about 300 minutes, followed by quenching to room temperature, to thereby stop reaction.

Subsequently, if desired, the resultant reaction mixture is caused to pass through a column filled with an ion-exchange resin for removal of unreacted metal salt and reducing agent, to thereby prepare a dilute metal nanocolloidal liquid. The degree of removal of unreacted metal salt and reducing agent can be assessed by measuring the electrical conductivity of the colloidal liquid. In the case where a colloidal liquid (100 mL) is treated with Amberlite MB-1 (trade name, product of Organo Corporation) serving as an ion-exchange resin, when the amount of the resin is about 6 mL, unreacted metal salt and reducing agent are sufficiently removed. In such a case, only a small amount of nanocolloidal metal particles is adsorbed onto the ion-exchange resin. In the case where the dilute metal nanocolloidal liquid is subjected to the below-described concentration process, the thus-concentrated nanocolloidal liquid may be treated with an ion-exchange resin.

The above-prepared dilute metal nanocolloidal liquid may be employed as it is for causing nanocolloidal metal particles to be carried on a carrier. Alternatively, the aforementioned dilute metal nanocolloidal liquid (e.g., dilute metal nanocolloidal liquid containing nanocolloidal metal particles in an amount of about 40 to about 120 mass ppm and containing substantially no protective colloid-forming agent) may be concentrated through thermal treatment under mild conditions (e.g., non-boiling conditions) for evaporation of the dispersion medium contained in the nanocolloidal liquid, to thereby prepare a high-concentration metal nanocolloidal liquid, and the thus-prepared high-concentration metal nanocolloidal liquid may be employed for causing nanocolloidal metal particles to be carried on a carrier. When, for example, the nanocolloidal liquid is concentrated under boiling conditions, colloidal particles are prone to aggregate through the effects of convection, breakage of generated bubbles, etc. Therefore, preferably, the nanocolloidal liquid is concentrated under mild conditions such that colloidal particles do not aggregate. In the case where the dispersion medium is water, the water may be removed through evaporation at ambient or reduced pressure and at about 50 to about 90° C. for about 15 minutes to about 240 minutes. The concentration of the nanocolloidal liquid can be controlled by varying pressure reduction degree, temperature, and concentration time.

No particular limitation is imposed on the reducing agent to be employed in the aforementioned procedure, so long as it can be dissolved in water. Examples of such a reducing agent include an alcohol, an citric acid compound, a carboxylic acid compound, a ketone, an ether, an aldehyde, and an ester. These reducing agents may be employed in combination of two or more species. Examples of the alcohol include methanol, ethanol, 1-propanol, 2-propanol, ethylene glycol, and glycerin. Examples of the citric acid compound include citric acid, and citric acid salts such as sodium citrate, potassium citrate, and ammonium citrate. Examples of the carboxylic acid compound include formic acid, acetic acid, fumaric acid, malic acid, succinic acid, aspartic acid, and salts of such a carboxylic acid. Examples of the ketone include acetone and methyl ethyl ketone. Examples of the ether include diethyl ether. Examples of the aldehyde include formaldehyde and acetaldehyde. Examples of the ester include methyl formate, methyl acetate, and ethyl acetate.

From the viewpoint of production of stable nanocolloidal metal particles having a mean particle size of about 1 to about 20 nm, the reducing agent to be employed is preferably an alcohol, a citric acid compound, or a carboxylic acid compound. Particularly, from the viewpoint of production of stable colloidal metal particles having a mean particle size of 1 to 5 nm, a citric acid compound is preferably employed. Particularly preferably, sodium citrate, which exhibits high reducing ability and is easy to handle, is employed. The mean particle size of the colloidal particles is preferably 1.6 nm or more, from the viewpoint of catalytic activity. The reaction medium to be employed may be any of the above-exemplified dispersion media.

No particular limitation is imposed on the type of a metal salt to be employed, so long as the metal salt can be dissolved in a reaction medium, can be reduced by a reducing agent, and can form colloidal particles. Examples of such a metal salt include chlorides, nitrates, and sulfates of metals such as platinum, ruthenium, palladium, rhodium, rhenium, osmium, gold, lead, iridium, cobalt, iron, nickel, copper, and tin (preferably, chlorides, nitrates, and sulfates of noble metals such as platinum, ruthenium, palladium, rhodium, rhenium, osmium, and gold); and complex compounds of such metals. These metal salts may be employed in combination of two or more species. When two metal salts are employed in combination, colloidal alloy particles can be produced. In the case where a platinum salt is employed as a metal salt, the particle size of colloidal particles can be particularly reduced, and stable colloidal particles having a mean particle size of about 1 to about 5 nm can be formed. Particularly when chloroplatinic acid is employed, colloidal particles having a more uniform particle size can be formed.

The metal nanocolloidal liquid of the present invention contains nanocolloidal metal particles having highly uniform particle size (mean particle size: about 1 to about 20 nm). The nanocolloidal metal particle concentration of the metal nanocolloidal liquid can be increased to 1,000 mass ppm or more. Thus, the metal nanocolloidal liquid exhibits excellent dispersion stability, although it contains substantially no protective colloid-forming agent.

Therefore, when the metal nanocolloidal liquid is employed for causing nanocolloidal metal particles to be carried on a carrier, the nanocolloidal metal particles can be easily and strongly carried on the carrier through a known technique such as immersion, electrodeposition, or spraying, whereby a metal-on-carrier of interest can be produced. Since the metal nanocolloidal liquid contains substantially no protective colloid-forming agent, the carrier on which the nanocolloidal metal particles are carried is not required to be subjected to firing. Therefore, the production process can be simplified, and formation of residues or impurities, which would otherwise occur through firing, can be prevented.

Various techniques may be employed for causing nanocolloidal particles to be carried on a carrier by use of the metal nanocolloidal liquid of the present invention. Among these techniques, electrodeposition or spraying is preferably employed.

In the case of electrodeposition, an electrically conductive carrier is employed.

The electrically conductive carrier to be employed may be, for example, (1) a carrier formed of a carbon material, an electrically conductive metal oxide material, or a metallic material, or (2) a carrier formed of a ceramic material, a non-electrically conductive metal oxide material, an organic polymer material, or a similar material, and having an electrically conductive layer on at least the surface thereof.

Examples of the carbon material described in (1) above include activated carbon, charcoal, carbon black, graphite, and carbon fiber. Typical examples of the electrically conductive metal oxide material include tin-doped indium oxide (ITO). Examples of the metallic material include cast iron; steel; iron-based alloys; aluminum and alloys thereof; magnesium and alloys thereof; zinc and alloys thereof; copper and alloys thereof; titanium and alloys thereof; and nickel, cobalt, and alloys thereof.

Examples of the ceramic material or non-electrically conductive metal oxide material described in (2) above include alumina, titania, magnesia, silica, silica-alumina, zirconia, zeolite, and glass. Examples of the organic polymer material include polyester resins such as polyethylene terephthalate, polybutylene terephthalate, polyethylene naphthalate, and polycarbonate; acrylic resins such as polymethyl methacrylate; polyolefin resins such as polyethylene, polypropylene, polymethylpentene, and polymers having an alicyclic structure; cellulose compounds such as cellophane, diacetylcellulose, triacetylcellulose, and acetylcellulose butyrate; polyvinyl chloride; polyvinylidene chloride; polyvinyl alcohol; ethylene-vinyl acetate copolymers; polyphenylene ether; polyphenylene sulfide; polystyrene; polysulfone; polyether-ether-ketone; polyether-sulfone; polyetherimide; polyimide; fluorocarbon resin; and polyamide. Such a material is non-electrically conductive, and thus electrical conductivity must be imparted to at least the surface of the material. Specifically, an electrically conductive layer is formed on the surface of such a non-electrically conductive material, or the material is formed by mixing its raw material with electrically conductive fine particles or electrically conductive fiber. No particular limitation is imposed on the material for forming an electrically conductive layer, or the electrically conductive fine particles or electrically conductive fiber to be mixed, so long as such material exhibits electrical conductivity.

No particular limitation is imposed on the form and shape of the aforementioned electrically conductive carrier, and the carrier may be in the form of, for example, rod-like material, fiber, woven fabric, nonwoven fabric, film, sheet, or plate-like material.

In the present invention, the aforementioned metal nanocolloidal liquid is employed, and nanocolloidal metal particles are caused to be carried on the aforementioned electrically conductive carrier through electrodeposition. The electrodeposition technique may be, for example, a conventionally employed technique for electrodeposition coating (also called "electrophoretic coating") by use of an aqueous coating material.

Specifically, DC voltage having an electric charge opposite to that of the nanocolloidal metal particles is applied to the electrically conductive carrier, so that the carrier serves as a working electrode. In this case, the counter electrode may be a metal nanocolloidal liquid tank formed of, for example, a steel plate; or may be an electrode provided in a metal nanocolloidal liquid tank formed of an insulating material.

Thus, when direct current is caused to flow between the working electrode formed of the electrically conductive carrier and the counter electrode, nanocolloidal particles contained in the metal nanocolloidal liquid migrate to the electrically conductive carrier and lose their electric charge thereon, and the particles are bonded to the surface of the carrier, whereby the particles are caused to be carried on the carrier. In this case, the direct current to be employed may be obtained through conversion of alternating current by means of a DC power supply (e.g., a silicon rectifier).

In the case of electrodeposition, in order to further improve dispersion stability of the nanocolloidal metal particles, preferably, the reducing agent which has been employed during production of the metal nanocolloidal liquid to be employed is added to the metal nanocolloidal liquid in an amount about 0.03 to about 0.25 times (by mole) the amount of the metal(s) constituting the nanocolloidal metal particles. This can suppress aggregation of the nanocolloidal metal particles, which is attributed to ions (e.g., nickel ions) coexisting with the particles. The aforementioned reducing agent is preferably, for example, sodium citrate.

When nanocolloidal metal particles are caused to be carried on a carrier through electrodeposition, in some cases, difficulty may be encountered in causing the particles to be carried on the carrier in accordance with the electrical charging states of the nanocolloidal particles and the surface of the carrier. In such a case, preferably, the carrier is subjected to surface treatment in advance with the reducing agent (preferably sodium citrate) which has been employed during production of the metal nanocolloidal liquid to be employed.

Thus, when nanocolloidal metal particles are caused to be carried on a carrier through the method of the present invention employing electrodeposition, the following effects are attained.

(1) Nanocolloidal metal particles can be caused to be carried on a carrier, with characteristics of the particles being maintained.
(2) A large amount of nanocolloidal metal particles can be caused to be carried on a carrier at a high carrying rate, although the colloidal liquid to be employed contains no protective colloid-forming agent.
(3) Without employing a protective colloid-forming agent, dispersion stability of nanocolloidal particles can be maintained even in the presence of ions coexisting with the particles.
(4) Even in the case where an electrically charged carrier on which nanocolloidal particles tend not to be carried is employed, the particles can be caused to be carried on the carrier in a facilitated manner.

The present invention also provides a metal-on-carrier produced by causing nanocolloidal metal particles to be carried on an electrically conductive carrier through the aforementioned electrodeposition technique.

When spraying is to be employed, there can be employed a carrier formed of, for example, a carbon material, a ceramic/metal oxide material, a metallic material, or an organic polymer material.

Examples of the carbon material include activated carbon, charcoal, carbon black, graphite, and carbon fiber. Examples of the ceramic/metal oxide material include alumina, titania, magnesia, silica, silica-alumina, zirconia, zeolite, silicon carbide, silicon nitride, and glass. Examples of the metallic material include cast iron; steel; iron-based alloys; aluminum and alloys thereof; magnesium and alloys thereof; zinc and alloys thereof; copper and alloys thereof; titanium and alloys thereof; and nickel, cobalt, and alloys thereof.

Examples of the organic polymer material include polyester resins such as polyethylene terephthalate, polybutylene terephthalate, polyethylene naphthalate, and polycarbonate; acrylic resins such as polymethyl methacrylate; polyolefin resins such as polyethylene, polypropylene, polymethylpentene, and polymers having an alicyclic structure; cellulose compounds such as cellophane, diacetylcellulose, triacetylcellulose, and acetylcellulose butyrate; polyvinyl chloride; polyvinylidene chloride; polyvinyl alcohol; ethylene-vinyl acetate copolymers; polystyrene; polysulfone; polyether-ether-ketone; polyether-sulfone; polyetherimide; polyimide; fluorocarbon resin; and polyamide.

No particular limitation is imposed on the form and shape of the carrier to be employed, and the carrier may be in the form of, for example, rod-like material, fiber, woven fabric, nonwoven fabric, film, sheet, plate-like material, or powder. Of these, a carrier formed of fibrous glass or scaly glass is preferred. When a carrier formed of fibrous glass or scaly glass is subjected to chemical treatment with an acid or alkali solution, pores are readily formed on the surface of the glass carrier. The thus-formed pores generally have an average diameter of about 1 to about 10 nm. Therefore, the aforementioned nanocolloidal particles can successfully enter the pores, and the particles can be strongly bonded to the glass carrier.

In the present invention, the aforementioned aqueous metal nanocolloidal liquid is employed, and nanocolloidal metal particles are caused to be carried on the aforementioned carrier through spraying. The spraying technique may be any known technique; for example, (1) a technique employing an air spray gun, in which a colloidal liquid is atomized by means of compressed air jet, and the thus-atomized liquid is applied to a carrier; (2) an application technique employing an airless spray gun; or (3) an application technique employing an ink-jet system.

In the technique employing an airless spray gun described in (2) above, when a colloidal liquid is fed into a hermetically sealed container by means of a high-pressure pump, and the colloidal liquid is ejected through a narrow nozzle, the colloidal liquid is atomized as a result of drastic change in volume, and the thus-atomized liquid reaches a carrier at high speed, whereby application is completed. This technique, which does not employ air for atomization of the colloidal liquid, is called airless spraying. The air spraying technique described in (1) above utilizes external force (compressed air), whereas the airless spraying technique utilizes internal force (liquid pressure).

In the method of the present invention, in order to cause a large amount of nanocolloidal metal particles to be carried on a carrier, preferably, the metal nanocolloidal liquid is concentrated in a vapor phase, and the nanocolloidal metal particles are caused to be carried on the carrier. From the viewpoint of productivity improvement, preferably, the carrier is heated to about 50 to about 90° C., and the metal nanocolloidal liquid is sprayed onto the thus-heated carrier. In the present invention, a masking member having a predetermined pattern may be provided on a surface of the carrier, and the metal nanocolloidal liquid may be sprayed onto the carrier through the masking member.

Thus, when nanocolloidal metal particles are caused to be carried on a carrier through the method of the present invention employing spraying, the following effects are attained.

(1) Since an aqueous dispersion medium is employed, advantages are obtained in terms of environmental sanitation, and the carrier may be less damaged.

(2) The concentration of a colloidal liquid can be readily regulated.

(3) Since the colloidal liquid contains substantially no protective colloid-forming agent, firing, reduction, or a similar treatment is not required, and thus characteristics of finely-divided metal particles are not deteriorated.

(4) Maintenance of a spray gun, nozzle, etc. is easily performed.

The present invention also provides a metal-on-carrier produced by causing nanocolloidal metal particles to be carried on a carrier through the aforementioned spraying technique.

EXAMPLES

The present invention will next be described in more detail by way of Examples, which should not be construed as limiting the invention thereto.

The hydrogen peroxide decomposition activity (catalytic activity) of a prepared platinum colloidal liquid was measured through the following procedure.

<Hydrogen Peroxide Decomposition Activity (Catalytic Activity)>

A stirrer chip is placed in an Erlenmeyer flask, a weight is attached to the flask, and the flask is placed in a hot water bath of 50° C. The stirrer chip is rotated (standard stirrer scale: 3), 30 mass % aqueous hydrogen peroxide (10 $cm^3$) is added to the Erlenmeyer flask by means of a pipetter, and the aqueous hydrogen peroxide is maintained for five minutes or more. Subsequently, a colloidal liquid ($1\times10^{-1}$ $cm^3$) is added to the Erlenmeyer flask by means of a micropipetter, and the flask is sealed immediately after addition of the colloidal liquid. The point in time when the colloidal liquid is added is taken as zero, and the amount (mol) of generated oxygen is measured by means of a flowmeter. The oxygen amount is measured 15, 30, 45, 60, 75, and 90 seconds after addition of the colloidal liquid.

The amount of generated oxygen per unit time and unit platinum amount (mol-$O_2$/mg-Pt/min) is determined on the basis of data obtained from 15 to 60 seconds after addition of the colloidal liquid. One sample is subjected to the above-described procedure three times, and the average of the thus-obtained data is employed for catalytic activity evaluation.

Example 1

A 1,500-mL flask, a 100-mL Erlenmeyer flask, a 200-mL Erlenmeyer flask, a reflux condenser, and a stirrer chip were immersed in aqua regia for one day, and subsequently these instruments were completely washed with ion-exchanged and ultrafiltrated pure water. Ion-exchanged and ultrafiltrated pure water (850 mL) and the stirrer chip were added to the 1,500-mL flask, and the reflux condenser was attached to the top of the flask, followed by heating to 100° C. Boiling was further continued for one hour for removal of oxygen dissolved in the pure water. Separately, chloroplatinic acid ($H_2PtCl_6.6H_2O$) (400 mg (150 mg as reduced to platinum)) was weighed and added to the 100-mL Erlenmeyer flask, and ion-exchanged and ultrafiltrated pure water was added thereto so that the volume of the resultant solution became 50 mL. Meanwhile, sodium citrate (1.0 g) was weighed and added to the 200-mL Erlenmeyer flask, and ion-exchanged and ultrafiltrated pure water was added thereto so that the volume of the resultant solution became 100 mL. After removal of oxygen dissolved in the pure water, the aqueous tetrachloroplatinic acid solution was transferred from the 100-mL Erlenmeyer flask to the 1,500-mL flask, followed by heating to 100° C. Boiling was further continued for 30 minutes for removal of dissolved oxygen. Subsequently, the aqueous sodium citrate solution contained in the 200-mL flask was gradually added to the 1,500-mL flask such that the boiling state was maintained. In the resultant reaction mixture, the amount of platinum is 150 mg/L=$7.7\times10^{-4}$ mol/L=$3.08\times10^{-3}$ N, and the ratio by mole concentration of sodium citrate to that of platinum is 13.2. Since sodium citrate serves as a one-electron donor, the ratio by equivalent concentration of sodium citrate to that of platinum is 3.3.

After the aqueous sodium citrate solution was completely added to the 1,500-mL flask, reduction reaction was continued under boiling. The reaction was stopped 90 minutes after initiation of the reaction, and the resultant reaction mixture was quenched to room temperature. The thus-cooled reaction mixture was caused to pass through a column filled with Amberlite MB-1 (ion-exchange resin, product of Organo Corporation) for removal of the metal ions and reducing agent remaining in the reaction mixture, to thereby yield a stable platinum colloidal liquid. The platinum colloidal liquid was subjected to plasma emission spectrometry for measurement of the amount of colloidal platinum particles. In addition, the mean particle size of the colloidal platinum particles was measured under a transmission electron microscope. As a result, the amount and mean particle size of the colloidal platinum particles were found to be 120 mg/L and 1.1 nm, respectively (hereinafter the platinum colloidal liquid may be referred to as "low-concentration platinum colloidal liquid A"). The low-concentration platinum colloidal liquid was found to have a hydrogen peroxide decomposition activity of 0.39 mol-$O_2$/mg-Pt/min.

Subsequently, the low-concentration platinum colloidal liquid was subjected to thermal treatment at 5.3 kPa and 60° C. for 120 minutes for evaporation of water contained in the colloidal liquid, to thereby prepare a platinum colloidal liquid having a colloidal platinum particle concentration as high as 1,000 mg/L (hereinafter the colloidal liquid may be referred to as "high-concentration platinum colloidal liquid B"). The high-concentration platinum colloidal liquid was found to have a hydrogen peroxide decomposition activity of 0.41 mol-$O_2$/mg-Pt/min, which is nearly equal to the hydrogen peroxide decomposition activity as measured before concentration.

From the results, it was deduced that the dispersion state of colloidal platinum particles contained in the high-concentration platinum colloidal liquid is similar to that of colloidal platinum particles contained in the non-concentrated platinum colloidal liquid. That is, it was confirmed that the concentration of the platinum colloidal liquid can be increased while the catalytic activity of the colloidal liquid is maintained.

The thus-obtained high-concentration platinum colloidal liquid was stored in air at ambient temperature for two weeks, and then the colloidal liquid was again subjected to catalytic activity measurement. As a result, the colloidal liquid was found to exhibit catalytic activity similar to that as measured before storage in air. That is, the colloidal liquid was found to have a service life such that no problem arises in practical use.

Example 2

Reaction was performed in a manner similar to that described in Example 1, to thereby yield a platinum colloidal liquid containing colloidal platinum particles (mean particle size: 3.5 nm) in an amount of 40 mg/L. The platinum colloidal liquid was concentrated and stored in a manner similar to that described in Example 1, followed by evaluation of catalytic activity. As a result, similar to the case of Example 1, the resultant high-concentration platinum colloidal liquid was found to maintain its catalytic activity even after concentration, and to have long service life.

Example 3

A 1,500-mL flask, two 100-mL Erlenmeyer flasks, a 200-mL Erlenmeyer flask, a reflux condenser, and a stirrer chip were immersed in aqua regia for one day, and subsequently these instruments were completely washed with ion-exchanged and ultrafiltrated pure water. Ion-exchanged and ultrafiltrated pure water (850 mL) and the stirrer chip were added to the 1,500-mL flask, and the reflux condenser was attached to the top of the flask, followed by heating to 100° C. Boiling was further continued for 20 minutes or more for removal of oxygen dissolved in the pure water.

Subsequently, trisodium citrate dihydrate (3.0 g) was weighed and added to the 200-mL Erlenmeyer flask, and ion-exchanged and ultrafiltrated pure water was added thereto so that the volume of the resultant solution became 50 mL. The thus-prepared aqueous sodium citrate solution was added little by little to the pure water contained in the 1,500-mL flask, followed by boiling for 10 minutes.

Separately, chloroplatinic acid ($H_2PtCl_6.6H_2O$) (520 mg (196 mg as reduced to platinum)) was weighed and added to one of the two 100-mL Erlenmeyer flasks, and ion-exchanged and ultrafiltrated pure water was added thereto, to thereby prepare 50 mL of an aqueous chloroplatinic acid solution. Meanwhile, ruthenium chloride hydrate ($RuCl_3.nH_2O$, n=3 to 4) (250 mg (about 93 mg as reduced to ruthenium)) was weighed and added to the other 100-mL Erlenmeyer flask, and ion-exchanged and ultrafiltrated pure water was added thereto, to thereby prepare 50 mL of an aqueous ruthenium chloride solution.

The aqueous chloroplatinic acid solution (50 mL) was added to the boiling mixture contained in the 1,500-mL flask. After the resultant mixture was cooled through addition of the solution, and then was returned to the boiling state, the aqueous ruthenium chloride solution (50 mL) was added to the mixture. After the resultant mixture was returned to the boiling state, the mixture was maintained for one hour under boiling, to thereby allow reduction reaction to proceed. The resultant reaction mixture was cooled to room temperature, and the thus-cooled reaction mixture was caused to pass through a column filled with Amberlite MB-1 (ion-exchange resin, product of Organo Corporation) for removal of the metal ions and reducing agent remaining in the reaction mixture, to thereby yield a stable platinum-ruthenium colloidal liquid. The platinum-ruthenium colloidal liquid was subjected to plasma emission spectrometry for measurement of the amount of colloidal platinum-ruthenium particles. In addition, the mean particle size of the colloidal platinum-ruthenium particles was measured under a transmission electron microscope. As a result, the amount and mean particle size of the colloidal platinum-ruthenium particles were found to be 250 mg/L and 3.5 nm, respectively. The ratio by mole of platinum to ruthenium was found to be 1:1.

The platinum-ruthenium colloidal liquid was found to have a hydrogen peroxide decomposition activity of 0.51 mol-$O_2$/mg-Pt/min.

Subsequently, the platinum-ruthenium colloidal liquid was subjected to thermal treatment at 5.3 kPa and 60° C. for 120 minutes for evaporation of water contained in the colloidal liquid, to thereby prepare a platinum-ruthenium colloidal liquid having a colloidal platinum-ruthenium particle concentration as high as 1,000 mg/L.

The high-concentration platinum-ruthenium colloidal liquid was found to have a hydrogen peroxide decomposition activity of 0.51 mol-$O_2$/mg-Pt/min, which is equal to the hydrogen peroxide decomposition activity as measured before concentration.

From the results, it was deduced that the dispersion state of colloidal platinum-ruthenium particles contained in the high-concentration platinum-ruthenium colloidal liquid is similar to that of colloidal platinum-ruthenium particles contained in the non-concentrated colloidal liquid. That is, it was confirmed that the concentration of the platinum-ruthenium colloidal liquid can be increased while the catalytic activity of the colloidal liquid is maintained.

The thus-obtained high-concentration platinum-ruthenium colloidal liquid was stored in air at ambient temperature for two weeks, and then the colloidal liquid was again subjected to catalytic activity measurement. As a result, the colloidal liquid was found to exhibit catalytic activity similar to that as measured before storage in air. That is, the colloidal liquid was found to have a service life such that no problem arises in practical use.

Example 4

A glass carrier having an electrically conductive film was immersed in the low-concentration platinum colloidal liquid A prepared in Example 1, followed by application of DC voltage under the below-described conditions. Colloidal platinum particles were caused to be carried on the surface of the glass carrier in any of the below-described voltage application times.

<Voltage Application Conditions>

Carrier: glass carrier having ITO film (working electrode)

Counter electrode: platinum wire

Voltage: sweeping within a range of 0 to 3 V (sweep rate: 0.5 V/minute)

Voltage application time: 10 minutes, 60 minutes, and 300 minutes

Electrodeposition temperature: 25° C. (room temperature)

In a manner similar to that described above, there were prepared a platinum colloidal liquid (25 mL) containing no sodium citrate, and a platinum colloidal liquid (25 mL) containing sodium citrate in an amount of 15.0 mmol/L. Nickel ion (1.7 mmol) was added to each of the thus-prepared colloidal liquids. Aggregation and precipitation were observed in the colloidal liquid containing no sodium citrate, whereas neither aggregation nor precipitation occurred in the colloidal liquid containing sodium citrate.

Example 5

The high-concentration platinum colloidal liquid B prepared in Example 1 was subjected to evaluation in a manner similar to that described in Example 4. As a result, colloidal platinum particles were caused to be carried on the surface of the glass carrier in any of the above-described voltage application times.

Example 6

The procedure of Example 1 was repeated, except that the amount of chloroplatinic acid ($H_2PtCl_6.6H_2O$) serving as a raw material was changed to 450 mg, to thereby yield a stable platinum colloidal liquid. The platinum colloidal liquid was subjected to evaluation in a manner similar to that described in Example 1. The amount and mean particle size of colloidal platinum particles were found to be 135 mg/L and 1.1 nm, respectively.

A modified PPE (amorphous polyphenylene ether) carrier having, on its surface, an electrically conductive Ni layer formed through electroless plating was immersed in the aforementioned platinum colloidal liquid, followed by application of DC voltage under the below-described conditions. Through this procedure, colloidal platinum particles were caused to be carried on the surface of the modified PPE carrier.

<Voltage Application Conditions>

Carrier: modified PPE carrier (having electrically conductive Ni layer, size: 10 mm×30 mm, thickness: 2 mm)

Counter electrode: stainless steel (SUS304)

Voltage: 5 V

Voltage application time: 10 minutes

Electrodeposition temperature: 25° C. (room temperature)

Example 7

A modified PPE carrier having, on its surface, an electrically conductive Ag layer formed through electroless plating was immersed in the platinum colloidal liquid prepared in Example 6, followed by application of DC voltage under the below-described conditions. Through this procedure, colloidal platinum particles were caused to be carried on the surface of the modified PPE carrier.

<Voltage Application Conditions>

Carrier: modified PPE carrier (having electrically conductive Ag layer, size: 10 mm×30 mm, thickness: 2 mm)

Counter electrode: stainless steel (SUS304)

Voltage: 8 V

Voltage application time: 15 minutes

Electrodeposition temperature: 25° C. (room temperature)

Example 8

The procedure of Example 7 was repeated, except that the voltage application time was changed to eight minutes. Similar to the case of Example 7, colloidal platinum particles were caused to be carried on the surface of the modified PPE carrier.

Examples 9 and 10

The colloidal-platinum-carried modified PPE carriers prepared in Examples 7 and 8 were employed as samples. Each of the samples was immersed in 3 mass % hydrogen peroxide, and then the amount of residual hydrogen peroxide was measured for evaluation of hydrogen peroxide decomposition rate. Table 1 shows results regarding the relation between elapsed time (unit: hours) and residual hydrogen peroxide amount (unit: mg/L). As is clear from Table 1, the amount of colloidal noble metal particles to be carried on a carrier can be controlled by appropriately selecting voltage application conditions; i.e., a catalyst having desired catalytic activity can be produced by appropriately selecting voltage application conditions. Therefore, when such a catalyst is employed for decomposing a disinfectant, an antiseptic, a bleaching agent, etc., the effects and decomposition rate of the disinfectant, etc. can be readily regulated.

TABLE 1

Table 1 Residual hydrogen peroxide amount (mg/L)

| | | Elapsed time (hours) | | | | | |
|---|---|---|---|---|---|---|---|
| | Catalyst | 0 | 2 | 3 | 4 | 5 | 6 |
| Example 9 | Colloidal-platinum-particles-carried modified PPE prepared in Example 7 | 30000 | 800 | 300 | 80 | 20 | 10 |
| Example 10 | Colloidal-platinum-particles-carried modified PPE prepared in Example 8 | 30000 | 1000 | 600 | 300 | 150 | 80 |

Example 11

The low-concentration platinum colloidal liquid A prepared in Example 1 was applied to a nonwoven fabric carrying carbon particles by means of an industrial spray gun (IWATA-W88, product of ANEST IWATA Corporation) under different application conditions (air pressure: 0.2 MPa, application amount: 5 $cm^3$, 10 $cm^3$, 20 $cm^3$). This application testing revealed the following.

(1) Good application was attained under any of the above conditions; clogging, etc. did not occur in the spray gun after application; and the colloidal liquid deposited onto the spray gun was easily rinsed off with water.

(2) When the carrier to which the colloidal liquid had been applied was allowed to stand, water was evaporated, and colloidal platinum particles were completely caused to be carried on the carrier.

(3) When the colloidal-liquid-applied carrier was dried in a drier at 50° C., the time required for completely causing colloidal platinum particles to be carried on the carrier was considerably reduced (the time was reduced by a factor of about 1/10).

(4) As a result of measurement of hydrogen peroxide decomposition activity of a sample obtained by causing colloidal platinum particles to be carried on the carrier, the sample was found to exhibit a catalytic activity nearly equal to the catalytic activity which is expected to be possessed by platinum particles contained in the platinum colloidal liquid.

(5) Even when the platinum colloidal liquid was applied to the carrier by means of a commercially available atomizer instead of the aforementioned industrial spray gun, similar to the case described above, a good sample was obtained, and cleaning and maintenance of the atomizer were very easily performed.

(6) The platinum colloidal liquid was placed on a hot plate of 80° C. for evaporation of water serving as a dispersion medium, to thereby concentrate the colloidal liquid by a factor of about 2. When the thus-concentrated colloidal liquid was applied to the carrier in a manner similar to that described above, a good sample was obtained. In addition, maintenance of the spray gun or atomizer employed was easily performed. Needless to say, since the platinum concentration was increased, the sample exhibited a hydrogen peroxide decomposition activity considerably higher than (twice or slightly higher) that of a sample obtained through a general process.

(7) The platinum colloidal liquid was further concentrated, to thereby prepare a colloidal liquid containing colloidal platinum particles in an amount of 1,000 mg/L, and a colloidal liquid containing colloidal platinum particles in an amount of 2,000 mg/L. Each of the thus-prepared colloidal liquids was subjected to application testing in a manner similar to that described above. As a result, good application performance was realized; clogging, etc. did not occur in the spray gun after application; and the colloidal liquid deposited onto the spray gun was easily rinsed off with water.

INDUSTRIAL APPLICABILITY

The metal nanocolloidal liquid of the present invention contains no protective colloid-forming agent, contains nanocolloidal metal particles in a large amount, and exhibits excellent dispersion stability over a long period of time. Therefore, the metal nanocolloidal liquid is suitable for use as a material for causing nanocolloidal metal particles to be carried on a variety of carriers.

According to the metal-on-carrier production method of the present invention, nanocolloidal metal particles can be efficiently caused to be carried on a carrier through an electrodeposition or spraying technique.

Specifically, the metal nanocolloidal liquid and metal-on-carrier production method of the present invention are applied to, for example, (1) electrically conductive particles, (2) a catalyst for purification of automobile exhaust gas, (3) a photocatalytic thin film, and (4) a reforming catalyst, a shift reaction catalyst, and an electrode catalyst in the field of fuel cell.

The invention claimed is:

1. A method for producing a metal-on-carrier, comprising causing nanocolloid metal particles to be carried on a carrier by use of a metal nanocolloidal liquid containing a dispersion medium and nanocolloidal metal particles, and containing substantially no protective colloid-forming agent, wherein the liquid has a nanocolloidal metal particle concentration of 250 mass ppm or more; wherein the protective colloid-forming agent content as reduced to carbon is equivalent to a total carbon of 0 to 200 mass ppm with respect to the nanocolloidal metal particles; wherein the dispersion medium is an aqueous medium, and the nanocolloidal metal particles are caused to be carried on the carrier through spraying; and, wherein the metal nanocolloidal liquid is concentrated in a vapor phase, and the nanocolloidal metal particles are caused to be carried on the carrier.

2. A method for producing a metal-on-carrier, comprising causing nanocolloid metal particles to be carried on a carrier by use of a metal nanocolloidal liquid containing a dispersion medium and nanocolloidal metal particles, and containing substantially no protective colloid-forming agent, wherein the liquid has a nanocolloidal metal particle concentration of 250 mass ppm or more; wherein the protective colloid-forming agent content as reduced to carbon is equivalent to a total carbon of 0 to 200 mass ppm with respect to the nanocolloidal metal particles; wherein the dispersion medium is an aqueous medium, and the nanocolloidal metal particles are caused to be carried on the carrier through spraying; and, wherein the carrier is heated to 50 to 90° C., and the metal nanocolloidal liquid is sprayed onto the thus-heated carrier.

3. A method for producing a metal-on-carrier, comprising causing nanocolloid metal particles to be carried on a carrier by use of a metal nanocolloidal liquid containing a dispersion medium and nanocolloidal metal particles, and containing substantially no protective colloid-forming agent, wherein the liquid has a nanocolloidal metal particle concentration of 250 mass ppm or more; wherein the protective colloid-forming agent content as reduced to carbon is equivalent to a total carbon of 0 to 200 mass ppm with respect to the nanocolloidal metal particles; wherein the dispersion medium is an aqueous medium, and the nanocolloidal metal particles are caused to be carried on the carrier through spraying; and, wherein the carrier is provided with a masking member on a surface thereof, and the metal nanocolloidal liquid is sprayed onto the carrier through the masking member.

* * * * *